United States Patent [19]

Maurer et al.

[11] 3,862,269
[45] Jan. 21, 1975

[54] 1-CARBALKOXY-2-CYANO-VINYL-(THIONO)-PHOSPHORIC ((PHOSPHONIC) ACID ESTERS OF ESTER AMIDES

[75] Inventors: Fritz Maurer; Hans-Jochem Riebel; Lothar Rohe, all of Wuppertal; Ingeborg Hammann; Wolfgang Behrenz, both of Cologne; Bernhard Homeyer, Opladen, all of Germany

[73] Assignee: Bayer Aktiengesellschaft, Leverkusen, Germany

[22] Filed: Mar. 14, 1973

[21] Appl. No.: 341,188

[30] Foreign Application Priority Data
Mar. 17, 1972 Germany............................ 2212906

[52] U.S. Cl.............. 260/940, 260/465.4, 260/973, 424/210
[51] Int. Cl.......... A01n 9/36, C07f 9/08, C07f 9/16
[58] Field of Search...................................... 260/940

[56] References Cited
UNITED STATES PATENTS
3,784,589   1/1974   Large.............................. 260/940 X
FOREIGN PATENTS OR APPLICATIONS
654,748   10/1964   Belgium.............................. 260/940

Primary Examiner—Lorraine A. Weinberger
Assistant Examiner—Richard L. Raymond
Attorney, Agent, or Firm—Burgess, Dinklage & Sprung

[57] ABSTRACT 1-carbalkoxy-2-cyano-vinyl-(thiono)-phosphoric (phosphonic) acid esters or ester amides of the formula

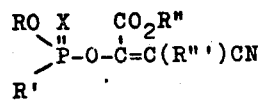

in which
R and R'' are alkyl of 1 to 6 carbon atoms,
R' is alkyl, alkoxy or monoalkylamino of 1 to 6 carbon atoms, or phenyl,
R''' is hydrogen or alkyl of 1 to 20 carbon atoms, and
X is oxygen or sulfur, which possess insecticidal and acaricidal properties.

7 Claims, No Drawings

1-CARBALKOXY-2-CYANO-VINYL-(THIONO)-PHOSPHORIC ((PHOSPHONIC) ACID ESTERS OF ESTER AMIDES

The present invention relates to and has for its objects the provision of particular new 1-carbalkoxy-2-cyano-vinyl-(thiono)-phosphoric (phosphonic) acid esters or ester amides which possess insecticidal and acaricidal properties, active compositions in the form of mixtures of such compounds with solid and liquid dispersible carrier vehicles and methods for producing such compounds and for using such compounds in a new way especially for combating pests, e.g. insects and acarids, with other and further objects becoming apparent from a study of the within specification and accompanying examples.

It is known from Y. Nishizawa, Bull. Agric. Chem. Soc., Japan 25, 61 – 65 (1961), Japanese Patent Specifications 2926 (1960) and 12217 (1966), and Belgian Patent Specification 654,748, that cyano- and/or carbalkoxy-substituted vinyl-(thiono)-phosphoric(-phosphonic) acid esters, such as O,O-diethyl-O-(1-methyl-2-cyano-2-phenylvinyl)-thiono-phosphoric, O-ethyl-O-(1-methyl-2-cyano-2-carbethoxyvinyl)-ethane- and O-ethyl-O-(1-carbethoxy-2-cyano-2-phenylvinyl)-phenyl-phosphonic acid ester, possess insecticidal properties.

The present invention provides 1-carbalkoxy-2-cyanovinyl-(thiono)-phosphoric(phosphonic) acid esters or ester amides of the general formula

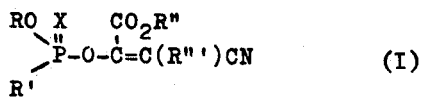

in which
R and R" are alkyl of 1 to 6 carbon atoms,
R' is alkyl, alkoxy or monoalkylamino of 1 to 6 carbon atoms, or phenyl, R''' is hydrogen or alkyl of 1 to 20 carbon atoms, and X is oxygen or sulfur.

Preferably R and R" are lower alkyl of 1 to 4 carbon atoms, R' is lower alkyl, alkoxy or monoalkylamino of 1 to 4 carbon atoms or phenyl, and R''' is hydrogen or alkyl with 1 to 16 carbon atoms.

The alkyl, alkoxy or monoalkylamino radicals may of course be straight-chain or branched radicals.

The general formula (I) embraces the cis- and trans-isomers of the constitutions (II) and (III) below, as well as mixtures of these isomers.

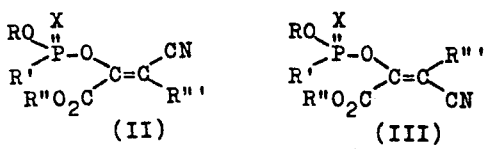

Surprisingly, the 1-carbalkoxy-2-cyanovinyl-(thionol)-phosphoric(phosphonic) acid esters or ester amides according to the invention show a considerably higher insecticidal, in particular soil-insecticidal, and acaricidal activity than previously known compounds of analogous constitution and of the same direction of activity. The compounds moreover also act very well against hygiene pests and pests of stored products. The substances according to the invention therefore represent a genuine enrichment of the art.

Furthermore, the compounds contribute to the reduction of the continuing requirement of new active compounds in the field of pesticides. This requirement originates in that, largely for reasons of environment protection, ever higher demands are being made of the commercially available agents, such as low toxicity to warm-blooded animals and low phytotoxicity, rapid degradation in and on the plant in short minimum intervals to be observed between spraying with pesticide and harvesting, effectiveness against resistant pests, etc.

The invention also provides a process for the production of a 1-carbalkoxy-2-cyanovinyl-(thiono)-phosphoric(phosphonic) acid ester or ester amide of the formula (I) in which an alkylnitrile of the general formula

$$R'''-CH_2-CN \qquad (IV)$$

is reacted with an oxalic acid diester of the general formula

in alkaline medium, and the resulting compound of the general formula

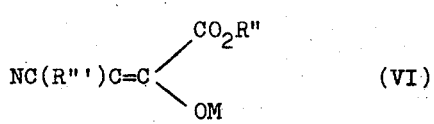

is reacted with a (thiono)-phosphoric(phosphonic) acid ester halide or ester amide halide of the general formula

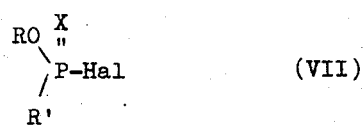

in which formulae
R, R', R", R''' and X possess the meanings given above,
M is a cation, for example sodium or potassium, and
Hal is halogen, preferably chlorine.

If acetonitrile, oxalic acid diethyl ester, sodium ethylate and O,O-diethylthionophosphoric acid ester chloride are used as starting materials, the reaction course can be represented by the following formula scheme:

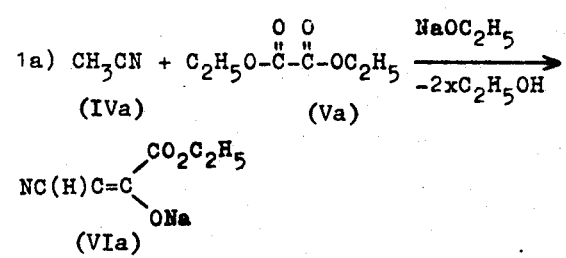

1b) 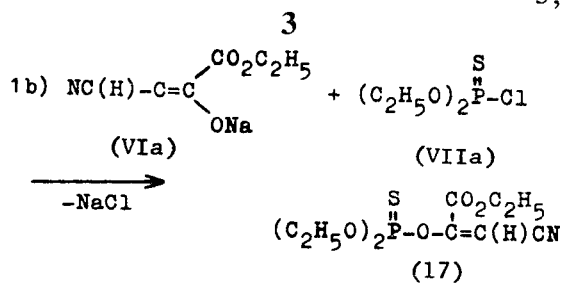

(17) $(C_2H_5O)_2\overset{S}{\underset{\|}{P}}-O-\overset{CO_2C_2H_5}{\underset{|}{C}}=C(H)CN$ The (thiono)-phosphoric(phosphonic) acid ester halides or ester amide halides (VII) and the alkyl nitriles (IV) and the oxalic acid diesters (V) required as starting materials are known from the literature and can readily be produced even on an industrial scale.

As examples of alkyl nitriles to be reacted according to the process, there are mentioned in particular: the nitriles of acetic, propionic, n-butyric, and iso-butyric acid, n-valeric acid, caproic acid, caprylic acid, capric acid, lauric acid and palmitic acid.

Of oxalic acid diesters to be used according to the process, particularly suitable are:
di-methyl or di-ethyl, di-n-propyl, di-iso-propyl, di-n-butyl, di-iso-butyl and di-sec.-butyl oxalates.

As (thiono)-phosphoric(phosphonic) acid ester halides or ester amide halides, there are mentioned in particular: O,O-dimethyl-, O,O-diethyl-, O,O-dipropyl-, O,O-di-isopropyl-, O,O-di-n-butyl-, O,O-di-sec.-butyl-, O,O-di-tert.-butyl-, O,O-di-isobutyl-, O-methyl-O-ethyl-, O-ethyl-O-isopropyl-, O-ethyl-O-n-butyl- and O-n-propyl-O-n-butyl-phosphoric acid ester chloride and their thiono analogues; further, O-methyl-, O-ethyl-, O-n-propyl-, O-iso-propyl-, O-n-butyl-, O-iso-butyl-, O-tert.-butyl- and O-sec.-butyl-methane-, -ethane-, -n-propane-, -iso-propane-, -n-butane-, -iso-butane-, -tert.-butane-, -sec.-butane- or -phenyl-phosphonic acid ester chloride and the corresponding thiono analogues as well as O-methyl-, O-ethyl-, O-n-propyl-, O-iso-propyl-, O-n-butyl-, O-iso-butyl-, O-sec.-butyl- and O-tert.-butyl-N-methyl- or -N-ethyl-, -N-n-propyl-, -N-iso-propyl-, -N-n-butyl-, -N-iso-butyl-, -N-sec.-butyl- and -N-tert.-butyl-phosphoric acid ester amide chloride and their thiono analogues.

The process according to the invention is preferably carried out in the presence of a solvent or diluent. As such, practically all inert organic solvents are suitable. These include, above all, aliphatic and aromatic optionally chlorinated hydrocarbons. The first step of the process is preferably caused to proceed in benzene, toluene, xylene, an ether such as diethyl ether or dibutyl ether, or an alcohol such as ethanol, iso-propanol or tert.-butanol, while the second step is carried out particularly advantageously in benzene, toluene, xylene, benzine, methylene chloride, chloroform, carbon tetrachloride, chlorobenzene, an ether such as diethyl ether or dibutyl ether or dioxane, a ketone such as acetone, methyl ethyl ketone, methyl isopropyl ketone or methyl isobutyl ketone, a nitrile such as acetonitrile or propionitrile, or an amide such as dimethyl formamide.

As an alkaline agent to ensure that the first step is carried out in alkaline medium, one may use an alkali metal alcoholate, especially sodium methylate, sodium ethylate, sodium isopropylate or potassium tert.-butylate.

The reaction temperatures can be varied within a fairly wide range. In general, the reactions are carried out at about 20° to 120°C, preferably about 75° to 100°C in the first step and about 30° to 50°C in the second step.

The reactions are, in general, carried out at normal pressure.

When carrying out the process, the starting materials are, in general, used in equimolar proportion. Expediently, a mixture of the nitrile component, the oxalic acid diester and the alkali is heated, without, or in a suitable solvent, to the elevated temperatures stated for several hours. After cooling of the mixture, the salt formed is either directly filtered off with suction or the reaction mixture is first poured into ether and the precipitate is then filtered off with suction and dried.

The salt-like intermediate products formed are suspended in a suitable solvent, and the phosphoric acid ester component is added. After several hours' reaction of the said elevated temperatures, the mixture is poured into a solvent, for example benzene, the organic phase is washed, dried and worked up in customary manner.

The substances according to the invention are obtained in most cases in the form of colored oils, some of which cannot be distilled without decomposition but, by so-called "slight distillation", that is, longer heating to moderately elevated temperatures under reduced pressure, can be freed from the last volatile components and in this way can be purified. Refractive indices are particularly useful for their characterization. If the products are obtained in crystalline form, they can be characterized by their melting points.

As already mentioned, the new 1-carbalkoxy-2-cyanovinyl-(thiono)-phosphoric(phosphonic) acid esters or ester amides are distinguished by an outstanding insecticidal (especially soil-insecticidal) and acaricidal effectiveness against crop pests, hygiene pests and pests of stored products. They possess a good activity both against sucking and biting insects, and mites (Acarina). At the same time they exhibit a low phytotoxicity.

For these reasons the compounds according to the invention can be used with success as pesticides in crop protection and the protection of stored products, as well as in the hygiene field.

To the sucking insects there belong, in the main, aphids (Aphidae) such as the green peach aphid (*Myzus persicae*), the bean aphid (*Doralis fabaet*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappahis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cottom worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aenus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus = Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001 and 10%, preferably 0.01 and 1%, by weight of the mixture.

Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001 and 95%, and preferably 0.01 and 95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50 to 100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20 to 100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples.

EXAMPLE 1

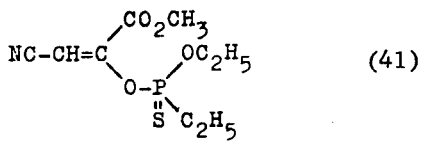

(41)

a. A mixture of 108 g (2 moles) sodium methylate, 82 g (2 moles) acetonitrile and 236 g (2 moles) oxalic acid dimethyl ester was heated to 80° to 90°C for 4 hours. After cooling, the reaction mixture was poured into 1 liter of ether. The precipitate was filtered off with suction and dried in a desiccator. 170 g (57% of theory) of the sodium salt of 3-cyanopyruvic acid methyl ester were obtained.

b. 29.8 g (0.2 mole) of the sodium salt obtained under (a) were suspended in 200 ml acetonitrile. To this suspension were added dropwise 34.4 g (0.2 mole) O-ethylethanethionophosphonic acid ester chloride and the mixture was allowed to after-react for a further 4 hours at 40°C. The reaction mixture was then poured into 300 ml benzene, the benzene solution was subsequently washed with saturated sodium bicarbonate solution and water, and dried over sodium sulfate, the solvent was drawn off, and the residue was distilled. 35 g (66.5% of theory) of the compound of the above constitution were obtained in the form of a yellow oil with the refractive index $n_D^{24} = 1.4969$ and the boiling point 135°C/0.01 mm Hg.

EXAMPLE 2

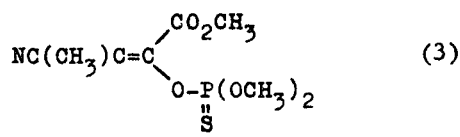

(3)

Analogously to Example 1(a), from 118 g (1 mole) oxalic acid dimethyl ester, 55 g (1 mole) propionitrile and 113 g (1 mole) potassium tert.-butylate in 1 mole methanol there were obtained 140 g (78% of theory) of the potassium salt of 3-methyl-3-cyanopyruvic acid methyl ester.

To 35.8 g (0.2 mole) of this salt were added dropwise 32 g (0.2 mole) O,O-dimethylthionophosphoric acid ester chloride. After 4 hours' heating to 40°C the reaction mixture was cooled and poured into 300 ml benzene, the mixture was washed with saturated sodium bicarbonate solution and water and, after drying over sodium sulfate had been effected, the solvent was drawn off. 26 g (50.5% of theory) of a red oil with the refractive index $n_D^{20} = 1.4948$ were obtained.

EXAMPLE 3

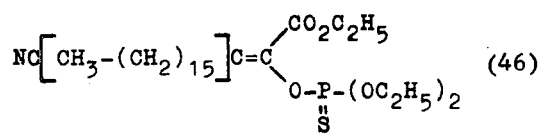

(46)

Analogously to Example 1(a), from oxalic acid diethyl ester, n-stearyl acid nitrile and potassium tert.-butylate in tert.-butanol there was obtained the potassium salt of 3-stearyl-3-cyanopyruvic acid ethyl ester.

To a suspension of 38.7 g of this salt in 350 ml dimethyl formamide were added dropwise, at 40°C, 18.8 g O,O-diethylthionophosphoric acid ester chloride and the mixture was heated to 60°C for a further 4 hours. The precipitate was then filtered off, the dimethyl formamide was drawn off under reduced pressure, the residue was poured into water, the aqueous solution was extracted with methylene chloride, the organic phase was washed and dried, and the solvent was drawn off. After slight distillation of the residue there were obtained 28 g (56.6% of theory) of an oil with the refractive index $n_D^{25} = 1.4748$.

EXAMPLE 4

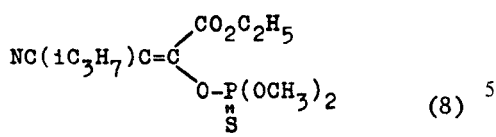
(8)

Analogously to Example 1(a), from potassium tert.-butylate, oxalic acid diethyl ester and i-valeric acid nitrile in ethanol there was obtained the potassium salt of 3-i-propyl-3-cyanopyruvic acid ethyl ester.

To 44.2 g (0.2 mole) of this salt were added dropwise 32 g (0.2 mole) O,O-dimethylthionophosphoric acid ester chloride. After 4 hours' heating to 40°C, the mixture was cooled and poured into 300 ml benzene, the benzene solution was washed with saturated sodium bicarbonate solution and water; after drying over sodium sulfate had been effected the solvent was drawn off and 29.3 g (48% of theory) of a yellow oil with the refractive index $n_D^{20} = 1.4830$ were obtained.

EXAMPLE 5

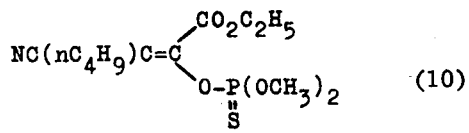
(10)

A mixture of 339 g (3 moles) potassium tert.-butylate, 600 ml ethanol, 438 g (3 moles) oxalic acid diethyl ester and 291 g (3 moles) capronitrile was heated under reflux for 4 hours, 3 liters of ether were added to the cooled solution, the salt formed was filtered off with suction and dried.

To 47.0 g (0.2 mole) of this salt in 200 ml acetonitrile were added dropwise 32 g O,O-dimethylthionophosphoric acid ester chloride, and the mixture was allowed to after-react for 4 hours at 40°C. The reaction mixture was then poured into 300 ml benzene, washed with saturated sodium bicarbonate solution and water and dried over sodium sulfate. After the solvent had been drawn off there remained behind a colorless oil. The yield was 70% of theory, the refraction index was $n_D^{25} = 1.4815$.

EXAMPLE 6

In analogous manner other compounds were synthesized, including prior art compounds outside the scope of the present invention. The full structures of many compounds synthesized are set forth in Table 1 while in Table 2 in different sequence there are set forth the radicals of the compounds of Table 1 plus Examples 1 to 5 plus others along with their yields and physical properties.

Table 1

| Compound No. | | Formula |
|---|---|---|
| (1) | (known) | $NC(C_6H_5)C=C\begin{smallmatrix}CH_3\\O-P(OC_2H_5)_2\\\|\\S\end{smallmatrix}$ |
| (2) | (known) | $NC(C_6H_5)C=C\begin{smallmatrix}CO_2C_2H_5\\O-P(C_6H_5)\\\|\\O\ \ OC_2H_5\end{smallmatrix}$ |
| (3) | | $NC(CH_3)C=C\begin{smallmatrix}CO_2CH_3\\O-P(OCH_3)_2\\\|\\S\end{smallmatrix}$ |
| (4) | | $NC(CH_3)C=C\begin{smallmatrix}CO_2C_2H_5\\O-P(OCH_3)_2\\\|\\S\end{smallmatrix}$ |
| (5) | | $NC(CH_3)C=C\begin{smallmatrix}CO_2C_2H_5\\O-P(C_2H_5)(OCH_3)\\\|\\S\end{smallmatrix}$ |
| (6) | | $NC(nC_3H_7)C=C\begin{smallmatrix}CO_2C_2H_5\\O-P(OCH_3)_2\\\|\\S\end{smallmatrix}$ |
| (7) | | $NC(nC_3H_7)C=C\begin{smallmatrix}CO_2C_2H_5\\O-P(C_2H_5)(OCH_3)\\\|\\S\end{smallmatrix}$ |
| (8) | | $NC(iC_3H_7)C=C\begin{smallmatrix}CO_2C_2H_5\\O-P(OCH_3)_2\\\|\\S\end{smallmatrix}$ |

Table 1 (continued)

| Compound No. | Formula |
|---|---|
| (9) | $NC(iC_3H_7)C=C\begin{smallmatrix}CO_2C_2H_5\\O-P(C_2H_5)(OCH_3)\\\|\\S\end{smallmatrix}$ |
| (10) | $NC(nC_4H_9)C=C\begin{smallmatrix}CO_2C_2H_5\\O-P(OCH_3)_2\\\|\\S\end{smallmatrix}$ |
| (11) | $NC(nC_4H_9)C=C\begin{smallmatrix}CO_2C_2H_5\\O-P(C_2H_5)(OCH_3)\\\|\\S\end{smallmatrix}$ |
| (12) | $NC(CH_3)C=C\begin{smallmatrix}CO_2C_3H_7i\\O-P(OCH_3)_2\\\|\\S\end{smallmatrix}$ |
| (13) | $NC(nC_3H_7)C=C\begin{smallmatrix}CO_2C_3H_7i\\O-P(OCH_3)_2\\\|\\S\end{smallmatrix}$ |
| (14) | $NC(nC_3H_7)C=C\begin{smallmatrix}CO_2C_3H_7i\\O-P(C_2H_5)(OCH_3)\\\|\\S\end{smallmatrix}$ |
| (15) | $NC-CH=C\begin{smallmatrix}CO_2CH_3\\O-P(OC_2H_5)_2\\\|\\S\end{smallmatrix}$ |
| (16) | $NC(CH_3)C=C\begin{smallmatrix}CO_2CH_3\\O-P(OC_2H_5)_2\\\|\\S\end{smallmatrix}$ |
| (17) | $NC-CH=C\begin{smallmatrix}CO_2C_2H_5\\O-P(OC_2H_5)_2\\\|\\S\end{smallmatrix}$ |
| (18) | $NC(CH_3)C=C\begin{smallmatrix}CO_2C_2H_5\\O-P(OC_2H_5)_2\\\|\\S\end{smallmatrix}$ |
| (19) | $NC(CH_3)C=C\begin{smallmatrix}CO_2C_2H_5\\O-P(C_2H_5)(OC_2H_5)\\\|\\S\end{smallmatrix}$ |
| (20) | $NC(nC_3H_7)C=C\begin{smallmatrix}CO_2C_2H_5\\O-P(OC_2H_5)_2\\\|\\S\end{smallmatrix}$ |
| (21) | $NC(nC_3H_7)C=C\begin{smallmatrix}CO_2C_2H_5\\O-P(CH_3)(OC_2H_5)\\\|\\S\end{smallmatrix}$ |
| (22) | $NC(iC_3H_7)C=C\begin{smallmatrix}CO_2C_2H_5\\O-P(OC_2H_5)_2\\\|\\S\end{smallmatrix}$ |

Table 1 (continued)
| Compound No. | Formula |
|---|---|
| (23) | 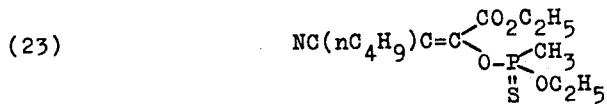 |
| (24) | 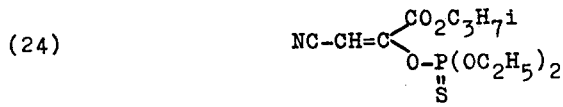 |
| (25) | 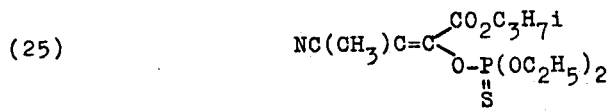 |
| (26) | 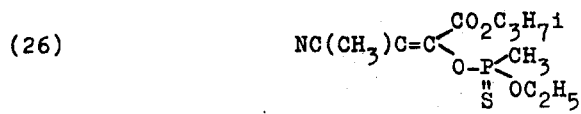 |
| (27) | 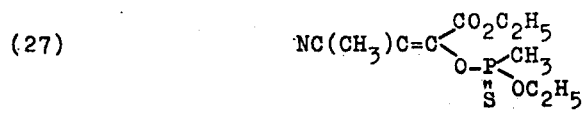 |
| (28) | 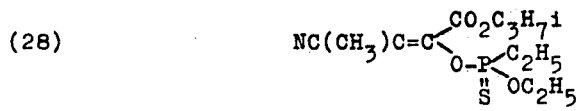 |
| (29) | 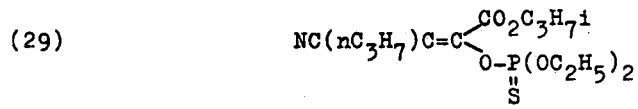 |
| (30) | 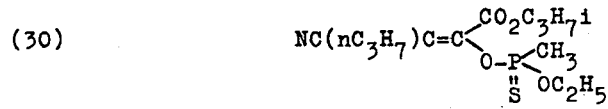 |
| (31) | 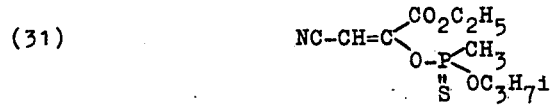 |
| (32) | 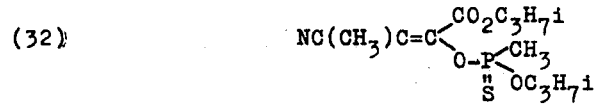 |
| (33) | 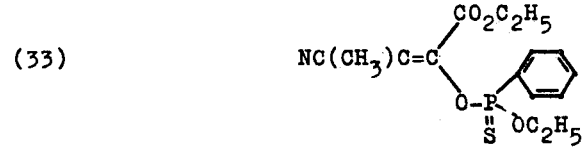 |
| (34) | 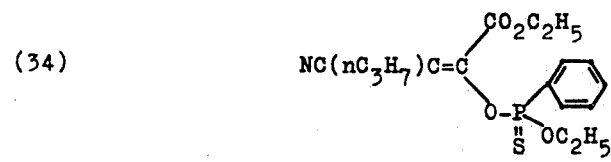 |

Table 1 (continued)

| Compound No. | Formula |
|---|---|
| (35) | $NC(CH_3)C=C\begin{smallmatrix}CO_2C_3H_7i\\O-P(C_6H_5)(OC_2H_5)\\\|\\S\end{smallmatrix}$ |
| (36) | $NC(CH_3)C=C\begin{smallmatrix}CO_2C_2H_5\\O-P(CH_3)(OC_3H_7i)\\\|\\S\end{smallmatrix}$ |
| (37) | $NC(CH_3)C=C\begin{smallmatrix}CO_2C_2H_5\\O-P(NHC_3H_7i)(OC_2H_5)\\\|\\S\end{smallmatrix}$ |
| (38) | $NC(CH_3)C=C\begin{smallmatrix}CO_2C_3H_7i\\O-P(OC_2H_5)_2\\\|\\O\end{smallmatrix}$ |
| (39) | $NC-CH=C\begin{smallmatrix}CO_2C_3H_7i\\O-P(OC_2H_5)_2\\\|\\O\end{smallmatrix}$ |
| (40) | $NC(CO_2C_2H_5)C=C\begin{smallmatrix}CH_3\\O-P(C_2H_5)(OC_2H_5)\\\|\\O\end{smallmatrix}$ |
| (41) | $NC-CH=C\begin{smallmatrix}CO_2CH_3\\O-P(C_2H_5)(OC_2H_5)\\\|\\S\end{smallmatrix}$ |
| (42) | $NC-CH=C\begin{smallmatrix}CO_2C_2H_5\\O-P(OCH_3)_2\\\|\\S\end{smallmatrix}$ |
| (43) | $NC-CH=C\begin{smallmatrix}CO_2C_2H_5\\O-P(C_2H_5)(OC_2H_5)\\\|\\S\end{smallmatrix}$ |
| (44) | $NC-CH=C\begin{smallmatrix}CO_2C_2H_5\\O-P(CH_3)(OC_2H_5)\\\|\\S\end{smallmatrix}$ |
| (45) | $NC-CH=C\begin{smallmatrix}CO_2C_3H_7i\\O-P(C_2H_5)(OC_2H_5)\\\|\\S\end{smallmatrix}$ |
| (46) | $NC(C_{16}H_{33})C=C\begin{smallmatrix}CO_2C_2H_5\\O-P(OC_2H_5)_2\\\|\\S\end{smallmatrix}$ |
| (47) | $NC-CH=C\begin{smallmatrix}CO_2C_2H_5\\C-P(OC_2H_5)_2\\\|\\O\end{smallmatrix}$ |

Table 1 (continued)

| Compound No. | Formula |
|---|---|
| (48) | 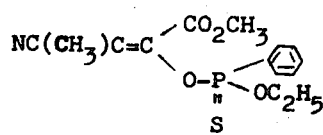 |
| (49) | 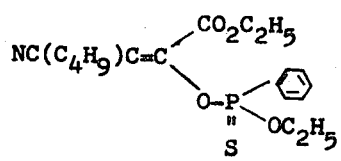 |
| (50) | 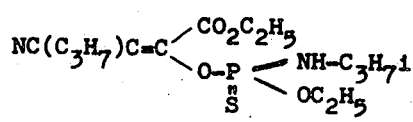 |
| (51) | 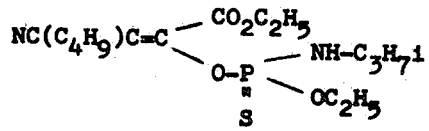 |

Table 2

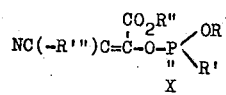

| Compound No. | X | R | R' | R" | R"' | b.p. (°C/mm Hg) | Refractive index Melting point | Yield (% of theory) |
|---|---|---|---|---|---|---|---|---|
| 15 | S | $-C_2H_5$ | $OC_2H_5$ | $CH_3$ | H | 120/0.01 | – | 57 |
| 52 | S | $-(CH(CH_3)_2$ | $O-CH(CH_3)_2$ | $CH_3$ | H | slightly distilled | $n_D^{25} = 1.4782$ | 46 |
| 17 | S | $-C_2H_5$ | $OC_2H_5$ | $C_2H_5$ | H | 130/0.01 | $n_D^{25} = 1.4779$ | 42 |
| 43 | S | $-C_2H_5$ | $-C_2H_5$ | $C_2H_5$ | H | 125/0.01 | $n_D^{25} = 1.4917$ | 46 |
| 53 | S | $-CH(CH_3)_2$ | $O-CH(CH_3)_2$ | $C_2H_5$ | H | 130/0.01 | $n_D^{25} = 1.4722$ | 22 |
| 54 | S | $-CH_2-CH_2-CH_3$ | $O-CH_2-CH_2-CH_3$ | $C_2H_5$ | H | slightly distilled | $n_D^{25} = 1.4828$ | 74 |
| 44 | S | $-C_2H_5$ | $-CH_3$ | $C_2H_5$ | H | slightly distilled | $n_D^{24} = 1.4959$ | 44 |
| 31 | S | $-CH(CH_3)_2$ | $-CH_3$ | $C_2H_5$ | H | slightly distilled | $n_D^{24} = 1.4905$ | 73 |
| 55 | S | $-C_2H_5$ | ⌬ | $C_2H_5$ | H | slightly distilled | $n_D^{23} = 1.5466$ | 68 |
| 47 | O | $-C_2H_5$ | $OC_2H_5$ | $C_2H_5$ | H | 135/0.01 | $n_D^{24} = 1.4467$ | 42 |
| 42 | S | $-CH_3$ | $OCH_3$ | $C_2H_5$ | H | 132/0.01 | $n_D^{24} = 1.4870$ | 44 |
| 56 | S | $-CH_3$ | $OCH_3$ | $-CH(CH_3)_2$ | H | 125-130/0.01 | $n_D^{22} = 1.4818$ | 61 |

Table 2 (continued)

| Compound No. | X | R | R' | R" | R"' | b.p. (°C/mm Hg) | Refractive index Boiling point | Yield (% of theory) |
|---|---|---|---|---|---|---|---|---|
| 24 | S | $-C_2H_5$ | $OC_2H_5$ | $-CH(CH_3)_2$ | H | 130/0.01 | $n_D^{22} = 1.4750$ | 59 |
| 45 | S | $-C_2H_5$ | $-C_2H_5$ | $-CH(CH_3)_2$ | H | 125/0.01 | $n_D^{22} = 1.4862$ | 52 |
| 57 | S | $-CH(CH_3)_2$ | $O-CH(CH_3)_2$ | $-CH(CH_3)_2$ | H | slightly distilled | $n_D^{25} = 1.4679$ | 53 |
| 39 | O | $-C_2H_5$ | $OC_2H_5$ | $-CH(CH_3)_2$ | H | 150/0.01 | $n_D^{25} = 1.4440$ | 46 |
| 16 | S | $-C_2H_5$ | $OC_2H_5$ | $CH_3$ | $CH_3$ | 145/0.01 | $n_D^{26} = 1.4808$ | 50 |
| 4 | S | $-CH_3$ | $OCH_3$ | $C_2H_5$ | $CH_3$ | 145/0.02 | $n_D^{26} = 1.4884$ | 48 |
| 18 | S | $-C_2H_5$ | $OC_2H_5$ | $C_2H_5$ | $CH_3$ | 140/0.01 | $n_D^{20} = 1.4821$ | 47 |
| 19 | S | $-C_2H_5$ | $-C_2H_5$ | $C_2H_5$ | $CH_3$ | 135/0.01 | $n_D^{21} = 1.4960$ | 53 |
| 33 | S | $-C_2H_5$ |  | $C_2H_5$ | $CH_3$ | slightly distilled | $n_D^{26} = 1.5432$ | 59 |
| 58 | S | $-CH(CH_3)_2$ | $-O-CH(CH_3)_2$ | $C_2H_5$ | $CH_3$ | slightly distilled | $n_D^{21} = 1.4799$ | 15 |
| 5 | S | $-CH_3$ | $-C_2H_5$ | $C_2H_5$ | $CH_3$ | slightly distilled | $n_D^{24} = 1.5038$ | 58 |
| 27 | S | $-C_2H_5$ | $-CH_3$ | $C_2H_5$ | $CH_3$ | slightly distilled | $n_D^{24} = 1.5059$ | 47 |
| 36 | S | $-CH(CH_3)_2$ | $-CH_3$ | $C_2H_5$ | $CH_3$ | slightly distilled | $n_D^{24} = 1.4991$ | 48 |
| 59 | S | $-CH_2-CH_2-CH_3$ | $O-CH_2-CH_2-CH_3$ | $C_2H_5$ | $CH_3$ | slightly distilled | $n_D^{24} = 1.4818$ | 55 |
| 37 | S | $-C_2H_5$ | $-NH-CH(CH_3)_2$ | $C_2H_5$ | $CH_3$ | slightly distilled | $n_D^{25} = 1.5992$ | 75 |
| 12 | S | $-CH_3$ | $OCH_3$ | $-CH(CH_3)_2$ | $CH_3$ | 160/0.02 | $n_D^{22} = 1.4853$ | 64 |
| 25 | S | $-C_2H_5$ | $OC_2H_5$ | $-CH(CH_3)_2$ | $CH_3$ | 150/0.01 | $n_D^{22} = 1.4773$ | 58 |
| 60 | S | $-CH(CH_3)_2$ | $OCH(CH_3)_2$ | $-CH(CH_3)_2$ | $CH_3$ | slightly distilled | $n_D^{28} = 1.4683$ | 59 |
| 28 | S | $-C_2H_5$ | $C_2H_5$ | $-CH(CH_3)_2$ | $CH_3$ | 145/0.01 | $n_D^{22} = 1.4902$ | 77 |
| 35 | S | $-C_2H_5$ |  | $-CH(CH_3)_2$ | $CH_3$ | slightly distilled | m.p. = 168°C | 90 |
| 26 | S | $-C_2H_5$ | $CH_3$ | $-CH(CH_3)_2$ | $CH_3$ | slightly distilled | $n_D^{24} = 1.4942$ | 52 |
| 32 | S | $-CH(CH_3)_2$ | $CH_3$ | $-CH(CH_3)_2$ | $CH_3$ | slightly distilled | m.p. = 66°C | 48 |
| 38 | O | $-C_2H_5$ | $OC_2H_5$ | $-CH(CH_3)_2$ | $CH_3$ | slightly distilled | $n_D^{28} = 1.4470$ | 77 |
| 61 | S | $-C_2H_5$ | $-NH-CH(CH_3)_2$ | $-CH(CH_3)_2$ | $CH_3$ | slightly distilled | m.p. = 34°C | 64 |
| 6 | S | $-CH_3$ | $OCH_3$ | $C_2H_5$ | $n-C_3H_7$ | slightly distilled | $n_D^{32} = 1.4797$ | 65 |
| 13 | S | $-CH_3$ | $OCH_3$ | $-CH(CH_3)_2$ | $n-C_3H_7$ | slightly distilled | $n_D^{25} = 1.4797$ | 79 |
| 20 | S | $C_2H_5$ | $OC_2H_5$ | $C_2H_5$ | $n-C_3H_7$ | slightly distilled | $n_D^{32} = 1.4740$ | 74 |
| 7 | S | $CH_3$ | $-C_2H_5$ | $C_2H_5$ | $n-C_3H_7$ | slightly distilled | $n_D^{32} = 1.4942$ | 71 |
| 21 | S | $C_2H_5$ | $CH_3$ | $C_2H_5$ | $n-C_3H_7$ | slightly distilled | $n_D^{32} = 1.4889$ | 75 |
| 34 | S | $C_2H_5$ |  | $C_2H_5$ | $n-C_3H_7$ | slightly distilled | $n_D^{20} = 1.5418$ | 69 |
| 29 | S | $C_2H_5$ | $OC_2H_5$ | $-CH(CH_3)_2$ | $n-C_3H_7$ | slightly distilled | $n_D^{25} = 1.4750$ | 75 |
| 30 | S | $C_2H_5$ | $CH_3$ | $-CH(CH_3)_2$ | $n-C_3H_7$ | slightly distilled | $n_D^{25} = 1.4862$ | 86 |
| 14 | S | $CH_3$ | $C_2H_5$ | $-CH(CH_3)_2$ | $n-C_3H_7$ | slightly distilled | $n_D^{25} = 1.4905$ | 79 |
| 22 | S | $C_2H_5$ | $OC_2H_5$ | $C_2H_5$ | $i-C_3H_7$ | slightly distilled | $n_D^{20} = 1.4758$ | 50 |
| 62 | S | $C_2H_5$ | $CH_3$ | $C_2H_5$ | $i-C_3H_7$ | slightly distilled | $n_D^{20} = 1.4913$ | 63 |
| 9 | S | $CH_3$ | $C_2H_5$ | $C_2H_5$ | $i-C_3H_7$ | slightly distilled | $n_D^{20} = 1.4966$ | 60 |
| 63 | S | $C_2H_5$ | $OC_2H_5$ | $C_2H_5$ | $n-C_4H_9$ | slightly distilled | $n_D^{25} = 1.4775$ | 78 |
| 11 | S | $CH_3$ | $C_2H_5$ | $C_2H_5$ | $n-C_4H_9$ | slightly distilled | $n_D^{25} = 1.4928$ | 74 |
| 23 | S | $C_2H_5$ | $CH_3$ | $C_2H_5$ | $n-C_4H_9$ | slightly distilled | $n_D^{25} = 1.4910$ | 75 |
| 64 | S | $CH_3$ | $OCH_3$ | $C_2H_5$ | $-(CH_2)_{15}CH_3$ | sligthly distilled | $n_D^{25} = 1.4770$ | 68 |
| 65 | S | $C_2H_5$ | $CH_3$ | $C_2H_5$ | $-(CH_2)_{15}CH_3$ | slightly distilled | $n_D^{25} = 1.4819$ | 66 |
| 66 | S | $1-C_3H_7$ | $O-1-C_3H_7$ | $C_2H_5$ | $-(CH_2)_{15}CH_3$ | slightly distilled | $n_D^{25} = 1.4707$ | 69 |
| 48 | S | $C_2H_5$ |  | $CH_3$ | $CH_3$ | 194/2 | $n_D^{21} = 1.5670$ | 48 |
| 67 | S | $C_2H_5$ | $NH-CH_3$ | $CH(CH_3)_2$ | $CH_3$ | slightly distilled | $n_D^{21} = 1.5002$ | 38 |
| 68 | S | $C_2H_5$ | $NH-CH_3$ | $C_2H_5$ | $CH_3$ | slightly distilled | $n_D^{21} = 1.5105$ | 52 |

Table 2 (continued)

| Compound No. | X | R | R' | R'' | R''' | b.p. (°C/mm Hg) | Refractive index Boiling point | Yield (% of theory) |
|---|---|---|---|---|---|---|---|---|
| 69 | S | i-$C_3H_7$ | O-i-$C_3H_7$ | $C_2H_5$ | n-$C_3H_7$ | slightly distilled | $n_D^{20}$ = 1.4747 | 59 |
| 49 | S | $C_2H_5$ |  | $C_2H_5$ | n-$C_4H_9$ | slightly distilled | $n_D^{23}$ = 1.5310 | 77 |
| 50 | S | $C_2H_5$ | NH-i-$C_3H_7$ | $C_2H_5$ | n-$C_3H_7$ | slightly distilled | $n_D^{23}$ = 1.4910 | 63 |
| 51 | S | $C_2H_5$ | NH-i-$C_3H_7$ | $C_2H_5$ | n-$C_4H_9$ | slightly distilled | $n_D^{23}$ = 1.4897 | 72 |
| 70 | S | $C_2H_5$ | NH-i-$C_3H_7$ | $C_2H_5$ | i-$C_3H_7$ | slightly distilled | $n_D^{23}$ = 1.4902 | 51 |

EXAMPLE 7

Drosophila test
Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier, and the concentrate was diluted with water to the desired concentration.

1 ml of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction was determined as a percentage: 100% means that all the flies were killed; 0% means that none of the flies were killed.

The active compounds, their concentrations, the evaluation times and the degree of destruction can be seen from the following Table 3:

Table 3

| Active compound | (Drosophila test) Concentration of active compound in % by weight | Degree of destruction in % after 1 day |
|---|---|---|
| (1) (known) | 0.1 | 20 |
| | 0.01 | 0 |
| (2) (known) | 0.1 | 100 |
| | 0.01 | 0 |
| (3) | 0.1 | 100 |
| | 0.01 | 100 |
| | 0.001 | 100 |
| (4) | 0.1 | 100 |
| | 0.01 | 100 |
| | 0.001 | 100 |
| | 0.0001 | 100 |
| (5) | 0.1 | 100 |
| | 0.01 | 100 |
| | 0.001 | 100 |
| | 0.0001 | 100 |
| (6) | 0.1 | 100 |
| | 0.01 | 100 |
| | 0.001 | 100 |
| | 0.0001 | 100 |
| (7) | 0.1 | 100 |
| | 0.01 | 100 |
| | 0.001 | 100 |
| | 0.0001 | 100 |
| (8) | 0.1 | 100 |
| | 0.01 | 100 |
| | 0.001 | 100 |
| (9) | 0.1 | 100 |
| | 0.01 | 100 |
| | 0.001 | 100 |
| | 0.0001 | 100 |
| (10) | 0.1 | 100 |
| | 0.01 | 100 |
| | 0.001 | 100 |

Table 3 — Continued

| Active compound | (Drosophila test) Concentration of active compound in % by weight | Degree of destruction in % after 1 day |
|---|---|---|
| | 0.1 | 100 |
| | 0.01 | 100 |
| (11) | 0.001 | 100 |
| | 0.1 | 100 |
| (12) | 0.01 | 100 |
| | 0.001 | 100 |
| | 0.0001 | 100 |
| | 0.00001 | 60 |
| | 0.1 | 100 |
| | 0.01 | 100 |
| (13) | 0.001 | 100 |
| | 0.0001 | 100 |
| | 0.1 | 100 |
| (14) | 0.01 | 100 |
| | 0.001 | 100 |
| | 0.0001 | 100 |
| | 0.1 | 100 |
| (15) | 0.01 | 100 |
| | 0.001 | 100 |
| | 0.1 | 100 |
| (16) | 0.01 | 100 |
| | 0.001 | 100 |
| | 0.0001 | 100 |
| | 0.00001 | 40 |
| | 0.1 | 100 |
| (17) | 0.01 | 100 |
| | 0.001 | 100 |
| | 0.0001 | 50 |
| | 0.1 | 100 |
| (18) | 0.01 | 100 |
| | 0.001 | 100 |
| | 0.1 | 100 |
| (19) | 0.01 | 100 |
| | 0.001 | 100 |
| | 0.0001 | 100 |
| | 0.1 | 100 |
| (20) | 0.01 | 100 |
| | 0.001 | 100 |
| | 0.1 | 100 |
| (21) | 0.01 | 100 |
| | 0.001 | 100 |
| | 0.0001 | 100 |
| | 0.1 | 100 |
| (22) | 0.01 | 100 |
| | 0.001 | 100 |
| | 0.1 | 100 |
| (23) | 0.01 | 100 |
| | 0.001 | 100 |
| | 0.1 | 100 |
| (24) | 0.01 | 100 |
| | 0.001 | 100 |
| | 0.1 | 100 |
| (25) | 0.01 | 100 |
| | 0.001 | 100 |
| | 0.0001 | 100 |
| | 0.00001 | 40 |
| | 0.01 | 100 |
| (26) | 0.01 | 100 |
| | 0.001 | 100 |
| | 0.0001 | 100 |
| | 0.1 | 100 |
| (27) | 0.01 | 100 |
| | 0.001 | 100 |
| | 0.0001 | 80 |
| | 0.1 | 100 |
| (28) | 0.01 | 100 |

Table 3-Continued

| Active compound | (Drosophila test) Concentration of active compound in % by weight | Degree of destruction in % after 1 day |
| --- | --- | --- |
|  | 0.001 | 100 |
|  | 0.0001 | 100 |
|  | 0.00001 | 100 |
|  | 0.1 | 100 |
| (29) | 0.01 | 100 |
|  | 0.001 | 90 |
|  | 0.1 | 100 |
| (30) | 0.01 | 100 |
|  | 0.001 | 100 |
|  | 0.0001 | 40 |
|  | 0.1 | 100 |
| (31) | 0.01 | 100 |
|  | 0.001 | 100 |
|  | 0.1 | 100 |
| (32) | 0.01 | 100 |
|  | 0.001 | 100 |

EXAMPLE 8

Plutella test
Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage 100% means that all the caterpillars were killed whereas 0% means that none of the caterpillars were killed.

The active compounds, the concentrations of the active compounds, the evaluation times and the results can be seen from the following Table 4.

Table 4

| Active compound | (Plutella test) Concentration of active compound in % by weight | Degree of destruction in % after 3 days |
| --- | --- | --- |
| (1) (known) | 0.1 | 90 |
|  | 0.01 | 0 |
| (2) (known) | 0.1 | 100 |
|  | 0.01 | 0 |
| (4) | 0.1 | 100 |
|  | 0.01 | 100 |
| (7) | 0.1 | 100 |
|  | 0.01 | 100 |
| (8) | 0.1 | 100 |
|  | 0.01 | 95 |
| (9) | 0.1 | 100 |
|  | 0.01 | 100 |
| (11) | 0.1 | 100 |
|  | 0.01 | 100 |
| (12) | 0.1 | 100 |
|  | 0.01 | 100 |
| (13) | 0.1 | 100 |
|  | 0.01 | 100 |
| (14) | 0.1 | 100 |
|  | 0.01 | 100 |
| (15) | 0.1 | 100 |
|  | 0.01 | 100 |
| (16) | 0.1 | 100 |
|  | 0.01 | 100 |
| (18) | 0.1 | 100 |
|  | 0.01 | 100 |
| (19) | 0.1 | 100 |
|  | 0.01 | 100 |
| (33) | 0.01 | 100 |

Table 4-Continued

| Active compound | (Plutella test) Concentration of active compound in % by weight | Degree of destruction in % after 3 days |
| --- | --- | --- |
|  | 0.001 | 80 |
|  | 0.1 | 100 |
| (21) | 0.01 | 100 |
|  | 0.1 | 100 |
| (34) | 0.01 | 100 |
|  | 0.1 | 100 |
| (22) | 0.01 | 100 |
|  | 0.1 | 100 |
| (23) | 0.01 | 100 |
|  | 0.1 | 100 |
| (25) | 0.01 | 100 |
|  | 0.1 | 100 |
| (27) | 0.01 | 100 |
|  | 0.1 | 100 |
| (28) | 0.01 | 100 |
|  | 0.1 | 100 |
| (35) | 0.01 | 100 |
|  | 0.001 | 100 |
|  | 0.1 | 100 |
| (29) | 0.01 | 100 |
|  | 0.1 | 100 |
| (30) | 0.01 | 100 |
|  | 0.1 | 100 |
| (36) | 0.01 | 100 |
|  | 0.1 | 100 |
| (48) | 0.01 | 100 |
|  | 0.001 | 75 |
|  | 0.1 | 100 |
| (49) | 0.01 | 100 |

EXAMPLE 9

Tetranychus test (resistant)
Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate so obtained was diluted with water to the desired concentration.

Bean plants (*Phaseolus vulgaris*), which had a height of approximately 10-30 cm., were sprayed with the preparation of active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained was expressed as a percentage: 100% means that all the spider mites were killed whereas 0% means that none of the spider mites were killed.

The active compounds, the concentrations of the active compounds, the evaluation times and the results can be seen from the following Table 5.

Table 5

| Active compound | (Tetranychus test / resistant) Concentration of active compound in % by weight | Degree of destruction in % after 2 days |
| --- | --- | --- |
| (1) (known) | 0.1 | 0 |
| (2) (known) | 0.1 | 0 |
| (16) | 0.1 | 90 |
| (17) | 0.1 | 90 |
| (19) | 0.1 | 100 |
| (37) | 0.1 | 99 |
| (21) | 0.1 | 90 |

Table 5—Continued

| Active compound | (Tetranychus test/resistant) Concentration of active compound in % by weight | Degree of destruction in % after 2 days |
|---|---|---|
| (23) | 0.1 | 99 |
| (24) | 0.1 | 95 |
| (39) | 0.1 | 98 |
| (38) | 0.1 | 98 |
| (26) | 0.1 | 98 |
| (27) | 0.1 | 100 |
|  | 0.01 | 60 |
| (30) | 0.1 | 90 |
| (36) | 0.1 | 100 |
| (32) | 0.1 | 100 |
|  | 0.01 | 98 |
| (48) | 0.1 | 95 |
| (50) | 0.1 | 90 |
| (51) | 0.1 | 90 |

EXAMPLE 10

$LT_{100}$ test for Diptera
Test insects: *Musca domestica*
Solvent: acetone 2 parts by weight of active compound were dissolved in 1000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it was covered with a glass lid.

The condition of the test insects was continuously observed. The time which was necessary for a 100% knock down effect was determined.

The test insects, the active compounds, the concentrations of the active compounds and the periods of time at which there is a 100% knock down effect can be seen from the following Table 6.

Table 6

| Active compound | ($LT_{100}$ test for Diptera / Musca domestica) Concentration of active compound of the solution in % by weight | $LT_{100}$ |
|---|---|---|
| (1) (known) | 0.2 | $8^h = 70\%$ |
| (2) (known) | 0.2 | 285' |
| (40) (known) | 0.02 | 125' |
|  | 0.02 | $8^h$ |
|  | 0.2 | 55' |
| (15) | 0.02 | 130' |
|  | 0.002 | $6^h$ |
|  | 0.2 | 80' |
| (41) | 0.02 | 130' |
|  | 0.2 | 45' |
| (42) | 0.02 | 70' |
|  | 0.002 | 145' |
|  | 0.0002 | $8^h$ |
|  | 0.2 | 55' |
| (17) | 0.02 | 195' |
|  | 0.002 | 210' |
|  | 0.2 | 85' |
| (43) | 0.02 | 125' |
|  | 0.002 | $8^h = 70\%$ |
|  | 0.2 | 70' |
| (44) | 0.02 | 95' |
|  | 0.002 | $6^h$ |
|  | 0.2 | 85' |

Table 6—Continued

| Active compound | ($LT_{100}$ test for Diptera / Musca domestica) Concentration of active compound of the solution in % by weight | $LT_{100}$ |
|---|---|---|
| (31) | 0.02 | 110' |
|  | 0.002 | $6^h = 70\%$ |
|  | 0.2 | 55' |
| (24) | 0.02 | 135' |
|  | 0.002 | $6^h$ |
|  | 0.0002 | $8^h = 90\%$ |
|  | 0.2 | 20' |
| (45) | 0.02 | 95' |
|  | 0.002 | 205' |
|  | 0.2 | 40' |
| (3) | 0.02 | 105' |
|  | 0.002 | 240' |
|  | 0.0002 | $8^h = 60\%$ |
|  | 0.2 | 40' |
| (4) | 0.02 | 75' |
|  | 0.002 | $6^h$ |
|  | 0.2 | 40' |
| (16) | 0.02 | 60' |
|  | 0.002 | 135' |
|  | 0.0002 | $8^h$ |
|  | 0.2 | 35' |
| (18) | 0.02 | 60' |
|  | 0.002 | 115' |
|  | 0.0002 | $6^h$ |
|  | 0.00002 | $8^h$ |
|  | 0.2 | 30' |
| (5) | 0.02 | 50' |
|  | 0.002 | 190' |
|  | 0.0002 | $8^h$ |
|  | 0.2 | 30' |
| (19) | 0.02 | 75' |
|  | 0.002 | 205' |
|  | 0.2 | 20' |
| (27) | 0.02 | 50' |
|  | 0.002 | 150' |
|  | 0.2 | 50' |
| (36) | 0.02 | 95' |
|  | 0.002 | $6^h = 80\%$ |
|  | 0.2 | 45' |
| (26) | 0.02 | 95' |
|  | 0.002 | $6^h = 60\%$ |
|  | 0.2 | 95' |
| (32) | 0.02 | 150' |
|  | 0.002 | $6^h = 50\%$ |
|  | 0.2 | 60' |
| (12) | 0.02 | 90' |
|  | 0.002 | $8^h = 70\%$ |
|  | 0.2 | 45' |
| (25) | 0.02 | 90' |
|  | 0.002 | $6^h$ |
|  | 0.2 | 60' |
| (28) | 0.02 | 120' |
|  | 0.002 | $6^h$ |
|  | 0.2 | 75' |
| (6) | 0.02 | 165' |
|  | 0.2 | 45' |
| (20) | 0.02 | 95' |
|  | 0.002 | $6^h$ |
|  | 0.2 | 50' |
| (7) | 0.02 | 95' |
|  | 0.002 | $8^h = 70\%$ |
|  | 0.2 | 45' |
| (21) | 0.02 | 125' |
|  | 0.2 | 95' |
| (13) | 0.02 | 135' |
|  | 0.002 | $6^h$ |
|  | 0.0002 | $8^h = 50\%$ |
|  | 0.2 | 75' |
| (30) | 0.02 | 135' |
|  | 0.002 | 240' |
|  | 0.0002 | $8^h = 70\%$ |
|  | 0.2 | 80' |
| (14) | 0.02 | 135' |
|  | 0.002 | 240' |
|  | 0.0002 | $8^h = 60\%$ |
|  | 0.2 | 110' |
| (8) | 0.02 | 130' |
|  | 0.002 | $6^h = 50\%$ |
|  | 0.2 | 45' |
| (9) | 0.02 | 70' |
|  | 0.002 | $6^h = 80\%$ |
|  | 0.2 | 75' |
| (46) | 0.02 | 190' |
|  | 0.002 | $6^h = 90\%$ |
|  | 0.2 | 45' |
| (47) | 0.02 | 90' |

Table 6-Continued

| Active compound | (LT$_{100}$ test for Diptera / Musca domestica) Concentration of active compound of the solution in % by weight | LT$_{100}$ |
|---|---|---|
| | 0.002 | 115' |
| | 0.0002 | 8$^h$ |
| | 0.2 | 60' |
| (39) | 0.02 | 75' |
| | 0.002 | 6$^h$ |
| | 0.2 | 60' |
| (38) | 0.02 | 135' |
| | 0.002 | 8$^h$ = 60 % |

EXAMPLE 11

LT$_{100}$ test for Diptera
Test insects: *Aedes aegypti*
Solvent: acetone 2 parts by weight of active compound were dissolved in 1000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it is covered with a glass lid.

The condition of the test insects was continuously observed. The time which was necessary for a 100% knock down effect was determined.

The test insects, the active compounds, the concentrations of the active compounds and the periods of time at which there is a 100% knock down effect can be seen from the following Table 7.

Table 7

| Active compound | (LT$_{100}$ test for Diptera / Aedes aegypti) Concentration of active compound of the solution in % by weight | LT$_{100}$ |
|---|---|---|
| (1) (known) | 0.2 | 3$^h$ = 90 % |
| (2) (known) | 0.2 | 180' |
| | 0.2 | 60' |
| (15) | 0.02 | 120' |
| | 0.002 | 180' |
| | 0.2 | 60' |
| (41) | 0.02 | 180' |
| | 0.2 | 120' |
| (42) | 0.02 | 180' |
| | 0.2 | 60' |
| (17) | 0.02 | 60' |
| | 0.002 | 180' |
| | 0.2 | 60' |
| (44) | 0.02 | 120' |
| | 0.2 | 120' |
| (31) | 0.02 | 120' |
| | 0.2 | 60' |
| (24) | 0.02 | 120' |
| | 0.2 | 120' |
| (45) | 0.02 | 180' |
| | 0.2 | 60' |
| (3) | 0.02 | 120' |
| | 0.002 | 120' |
| | 0.2 | 60' |
| (4) | 0.02 | 60' |
| | 0.002 | 120' |
| | 0.002 | 180' |
| | 0.2 | 60' |
| (16) | 0.02 | 60' |

Table 7-Continued

| Active compound | (LT$_{100}$ test for Diptera / Aedes aegypti) Concentration of active compound of the solution in % by weight | LT$_{100}$ |
|---|---|---|
| | 0.002 | 60' |
| | 0.0002 | 3$^h$ = 80 % |
| | 0.2 | 60' |
| (18) | 0.02 | 60' |
| | 0.002 | 120' |
| | 0.2 | 60' |
| (5) | 0.02 | 60' |
| | 0.002 | 180' |
| | 0.0002 | 180' |
| | 0.2 | 60' |
| (19) | 0.02 | 60' |
| | 0.002 | 120' |
| | 0.2 | 60' |
| (27) | 0.02 | 60' |
| | 0.002 | 120' |
| | 0.0002 | 3$^h$ = 50 % |
| | 0.2 | 60' |
| (36) | 0.02 | 120' |
| | 0.2 | 60' |
| (26) | 0.02 | 60' |
| | 0.002 | 120' |
| | 0.2 | 120' |
| (32) | 0.02 | 120' |
| | 0.2 | 60' |
| (12) | 0.02 | 120' |
| | 0.2 | 120' |
| (28) | 0.02 | 180' |
| | 0.2 | 60' |
| (6) | 0.02 | 120' |
| | 0.2 | 60' |
| (20) | 0.02 | 120' |
| | 0.2 | 60' |
| (7) | 0.02 | 120' |
| | 0.002 | 180' |
| | 0.2 | 120' |
| (21) | 0.02 | 120' |
| | 0.2 | 120' |
| (13) | 0.02 | 180' |
| | 0.2 | 120' |
| (30) | 0.02 | 180' |
| | 0.2 | 120' |
| (14) | 0.02 | 180' |
| | 0.2 | 120' |
| (8) | 0.02 | 120' |
| | 0.2 | 60' |
| (22) | 0.02 | 60' |
| | 0.002 | 180' |
| | 0.0002 | 180' |
| | 0.2 | 60' |
| (9) | 0.02 | 120' |
| | 0.002 | 3$^h$ = 50 % |
| | 0.2 | 120' |
| (11) | 0.02 | 180' |
| | 0.2 | 60' |
| (46) | 0.02 | 120' |
| | 0.2 | 60' |
| (47) | 0.02 | 120' |
| | 0.2 | 60' |
| (38) | 0.02 | 120' |

EXAMPLE 12

LD$_{100}$ test
Test insects: *Sitophilus granarius*
Solvent: acetone 2 parts by weight of the active compound were dissolved in 1000 parts by volume of the solvent. The solution so obtained was diluted with further solvent to the desired lower concentrations.

2.5 of the solution of the active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it was covered with a glass lid.

The condition of the test insects was observed 3 days after the commencement of the experiments; the destruction was determined as a percentage.

The active compounds, the concentrations of the active compounds, the test insects and the results can be seen from the following Table 8.

Table 8

| Active compound | (LD₁₀₀ test / Sitophilus granarius) Concentration of active compound of the solution in % by weight | Destruction in % |
|---|---|---|
| (1) (known) | 0.2 | 0 |
| (2) (known) | 0.2 | 0 |
| (40) (known) | 0.2 | 0 |
| (17) | 0.2 | 100 |
|  | 0.02 | 100 |
| (24) | 0.2 | 100 |
|  | 0.02 | 100 |
| (3) | 0.2 | 100 |
|  | 0.02 | 100 |
|  | 0.002 | 100 |
| (4) | 0.2 | 100 |
|  | 0.02 | 100 |
|  | 0.002 | 100 |
|  | 0.0002 | 90 |
| (16) | 0.2 | 100 |
|  | 0.02 | 100 |
|  | 0.002 | 100 |
|  | 0.0002 | 30 |
| (18) | 0.2 | 100 |
|  | 0.02 | 100 |
|  | 0.002 | 90 |
| (5) | 0.2 | 100 |
|  | 0.02 | 100 |
|  | 0.002 | 100 |
|  | 0.0002 | 90 |
| (19) | 0.2 | 100 |
|  | 0.02 | 100 |
|  | 0.002 | 100 |
| (27) | 0.2 | 100 |
|  | 0.02 | 100 |
| (26) | 0.2 | 100 |
|  | 0.02 | 100 |
|  | 0.002 | 100 |
| (12) | 0.2 | 100 |
|  | 0.02 | 100 |
|  | 0.002 | 90 |
| (25) | 0.2 | 100 |
|  | 0.02 | 100 |
| (28) | 0.2 | 100 |
|  | 0.02 | 100 |
| (33) | 0.2 | 100 |
|  | 0.02 | 100 |
|  | 0.002 | 90 |
| (35) | 0.2 | 100 |
|  | 0.02 | 100 |
|  | 0.002 | 30 |
| (6) | 0.2 | 100 |
|  | 0.02 | 100 |
|  | 0.002 | 50 |
| (7) | 0.2 | 100 |
|  | 0.02 | 100 |
|  | 0.002 | 50 |
| (22) | 0.2 | 100 |
|  | 0.02 | 100 |
| (10) | 0.2 | 100 |
|  | 0.02 | 100 |
| (38) | 0.2 | 100 |
|  | 0.02 | 80 |

EXAMPLE 13

LD₁₀₀ test
Test insects: *Blatta orientalis*
Solvent: acetone 2 parts by weight of the active compound were dissolved in 1000 parts by volume of the solvent. The solution so obtained was diluted with further solvent to the desired lower concentrations. 2.5 ml of the solution of the active compound were pipetted into a Petri dish. On the bottom of the Petri dish there was a filter paper with a diameter of about 9.5 cm. The Petri dish remained uncovered until the solvent had completely evaporated. The amount of active compound per square centimeter of filter paper varied with the concentration of the solution of active compound used. About 25 test insects were then placed in the Petri dish and it was covered with a glass lid.

The condition of the test insects was observed 3 days after commencement of the experiments; the destruction was determined as a percentage.

The active compounds, the concentrations of the active compounds, the test insects and the results can be seen from the following Table 9.

Table 9

| Active compound | (LD₁₀₀ test / Blatta orientalis) Concentration of active compound of the solution in % by weight | Destruction in % |
|---|---|---|
| (1) (known) | 0.2 | 0 |
| (3) | 0.2 | 100 |
|  | 0.02 | 100 |
| (4) | 0.2 | 100 |
|  | 0.02 | 60 |
| (16) | 0.2 | 100 |
|  | 0.02 | 100 |
| (18) | 0.2 | 100 |
|  | 0.02 | 100 |
|  | 0.002 | 30 |
| (5) | 0.2 | 100 |
|  | 0.02 | 100 |
| (19) | 0.2 | 100 |
|  | 0.02 | 100 |
|  | 0.002 | 30 |
| (27) | 0.2 | 100 |
|  | 0.02 | 100 |
|  | 0.002 | 30 |
| (36) | 0.2 | 100 |
|  | 0.02 | 100 |
| (26) | 0.2 | 100 |
|  | 0.02 | 60 |
| (32) | 0.2 | 100 |
|  | 0.02 | 100 |
|  | 0.002 | 100 |
| (12) | 0.2 | 100 |
|  | 0.02 | 30 |
| (20) | 0.2 | 100 |
|  | 0.02 | 30 |
| (7) | 0.2 | 100 |
|  | 0.02 | 60 |
| (8) | 0.2 | 100 |
|  | 0.02 | 100 |

It will be appreciated that the instant specification and examples are set forth by way of illustration and not limitation, and that various modifications and changes may be made without departing from the spirit and scope of the present invention.

What is claimed is:

1. A 1-carbalkoxy-2-cyano-vinyl-(thiono)-phosphoric(phosphonic) acid ester or ester amide of the formula

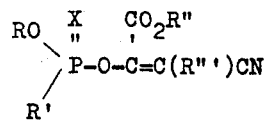

in which
R and R'' are alkyl of 1 to 6 carbon atoms,
R' is alkyl, alkoxy or monoalkylamino of 1 to 6 carbon atoms, or phenyl,
R''' is hydrogen or alkyl of 1 to 20 carbon atoms, and
X is oxygen or sulfur.

2. A compound according to claim 1 in which R and R'' are alkyl of 1 to 4 carbon atoms, R' is alkyl, alkoxy or monoalkylamino of 1 to 4 carbon atoms or phenyl, and R''' is hydrogen or alkyl of 1 to 16 carbon atoms.

3. The compound according to claim 1, wherein such compound is methyl-O-ethyl-O-(1-carbethoxy-2-cyano-2-methyl)-vinyl-thionophosphonic acid ester of the formula

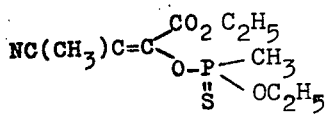

4. The compound according to claim 1, wherein such compound is ethyl-O-methyl-O-(1-carbisopropoxy-2-cyano-2-methyl)-vinyl-thionophosphonic acid ester of the formula

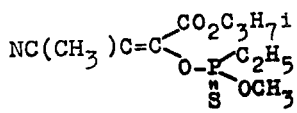

5. The compound according to claim 1, wherein such compound is O,O-diethyl-O-(1-carbethoxy-2-cyano-2-methyl)-vinyl-thionophosphoric acid ester of the formula

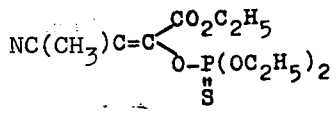

6. The compound according to claim 1, wherein such compound is methyl-O-isopropyl-O-(1-carbethoxy-2-cyano-2-methyl)-vinyl-thionophosphonic acid ester of the formula

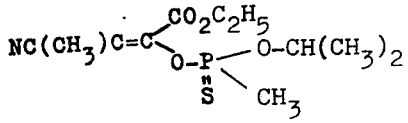

7. The compound according to claim 1, wherein such compound is phenyl-O-ethyl-O-(1-carbethoxy-2-cyano-2-methyl)-vinyl-thionophosphonic acid ester of the formula

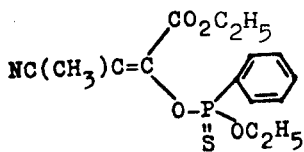

* * * * *